United States Patent
Swenson et al.

(10) Patent No.: US 8,711,929 B2
(45) Date of Patent: Apr. 29, 2014

(54) NETWORK-BASED DYNAMIC ENCODING

(75) Inventors: Erik R. Swenson, San Jose, CA (US); Nitin Bhandari, Fremont, CA (US)

(73) Assignee: Skyfire Labs, Inc., Mountain View, CA (US)

(*) Notice: Subject to any disclaimer, the term of this patent is extended or adjusted under 35 U.S.C. 154(b) by 1071 days.

(21) Appl. No.: 11/929,760

(22) Filed: Oct. 30, 2007

(65) Prior Publication Data
US 2008/0101466 A1 May 1, 2008

Related U.S. Application Data

(60) Provisional application No. 60/863,888, filed on Nov. 1, 2006.

(51) Int. Cl.
*H04N 11/02* (2006.01)
(52) U.S. Cl.
USPC .................................................. 375/240.07
(58) Field of Classification Search
None
See application file for complete search history.

(56) References Cited

U.S. PATENT DOCUMENTS

| | | | |
|---|---|---|---|
| 5,708,511 A | 1/1998 | Gandhi et al. | |
| 5,727,159 A | 3/1998 | Kikinis | |
| 5,821,915 A | 10/1998 | Graham et al. | |
| 6,008,847 A | 12/1999 | Bauchspies | |
| 6,038,257 A * | 3/2000 | Brusewitz et al. | 375/240.21 |
| 6,266,817 B1 * | 7/2001 | Chaddha | 375/240.11 |
| 6,275,534 B1 * | 8/2001 | Shiojiri | 375/240.25 |
| 6,282,240 B1 * | 8/2001 | Fukunaga et al. | 375/240.01 |
| 6,285,791 B1 | 9/2001 | Bjorklund | |
| 6,292,834 B1 | 9/2001 | Ravi et al. | |
| 6,366,298 B1 | 4/2002 | Haitsuka et al. | |
| 6,397,230 B1 | 5/2002 | Carmel et al. | |
| 6,496,203 B1 | 12/2002 | Beaumont et al. | |
| 6,529,552 B1 * | 3/2003 | Tsai et al. | 375/240.05 |

(Continued)

FOREIGN PATENT DOCUMENTS

| | | |
|---|---|---|
| JP | 2003-259310 A2 | 9/2003 |
| JP | 2006-270690 A | 10/2006 |
| WO | WO 2005/081528 A1 | 9/2005 |

OTHER PUBLICATIONS

Hsieh, M. et al., "Stateful Session Handoff for Mobile WWW," Information Sciences 2005 [online] [Retrieved on Apr. 10, 2008] Retrieved from the Internet<URL: http://64.233.179.104/scholar?num=30&hl=en&lr=&q=cache:hiW5F6of2CUJ:140.115.51.197/web/PaperManage/Paper/Stateful%2520session%2520hand-off%2520for%2520mobile%2520WWW.pdf>.

(Continued)

*Primary Examiner* — Chirag Shah
*Assistant Examiner* — Joshua Smith
(74) *Attorney, Agent, or Firm* — Fenwick & West LLP

(57) ABSTRACT

A network-based video encoding and decoding system encodes and decodes remotely displayed user application data on a centralized desktop computer. Remotely displayed user application data are screen captures of a browsing application run by the centralized desktop computer on user's behalf. The encoding system optimizes its encoding performance using back channel information which includes real time network capacity information and decoder feedback. The encoding system consults a back channel information manager to dynamically adjust encoding parameters. Based on the real time network capacity information received, the encoding system adjusts its capturing sampling rate. Based on encoding errors identified by the decoding system, the encoding system selectively re-sends previously encoded frames/blocks, or send intra frames on demand to allow the decoding system to correct encoding errors. In response to encoding customization requests from the decoding system, the encoding system adjusts its encoding parameters to meet such requests.

25 Claims, 11 Drawing Sheets

(56) References Cited

U.S. PATENT DOCUMENTS

| | | | |
|---|---|---|---|
| 6,563,517 B1 | 5/2003 | Bhagwat et al. | |
| 6,578,201 B1 | 6/2003 | LaRocca et al. | |
| 6,584,493 B1 | 6/2003 | Butler | |
| 6,704,024 B2 | 3/2004 | Robotham et al. | |
| 6,909,753 B2* | 6/2005 | Meehan et al. | 375/240.27 |
| 6,990,534 B2 | 1/2006 | Mikhailov et al. | |
| 7,016,963 B1 | 3/2006 | Judd et al. | |
| 7,043,745 B2* | 5/2006 | Nygren et al. | 375/240.26 |
| 7,054,365 B2* | 5/2006 | Kim et al. | 375/240.2 |
| 7,088,398 B1* | 8/2006 | Wolf et al. | 375/240.28 |
| 7,116,843 B1 | 10/2006 | Wensley et al. | |
| 7,257,158 B1* | 8/2007 | Figueredo et al. | 375/240.01 |
| 7,483,575 B2 | 1/2009 | Fukuhara et al. | |
| 7,821,953 B2* | 10/2010 | Yarlagadda et al. | 370/252 |
| 8,018,850 B2* | 9/2011 | van Beek et al. | 375/240.02 |
| 2002/0015532 A1* | 2/2002 | Kostrzewski et al. | 382/243 |
| 2002/0041629 A1* | 4/2002 | Hannuksela | 375/240.12 |
| 2002/0059368 A1 | 5/2002 | Reynolds | |
| 2002/0067353 A1 | 6/2002 | Kenyon et al. | |
| 2002/0122491 A1* | 9/2002 | Karczewicz et al. | 375/240.25 |
| 2002/0131083 A1 | 9/2002 | Hamzy et al. | |
| 2002/0146074 A1* | 10/2002 | Ariel et al. | 375/240.27 |
| 2003/0020722 A1 | 1/2003 | Miura | |
| 2003/0039312 A1 | 2/2003 | Horowitz et al. | |
| 2003/0046708 A1* | 3/2003 | Jutzi | 725/120 |
| 2003/0079222 A1 | 4/2003 | Boykin et al. | |
| 2003/0122954 A1 | 7/2003 | Kassatly | |
| 2003/0132957 A1 | 7/2003 | Ullmann et al. | |
| 2003/0138050 A1* | 7/2003 | Yamada et al. | 375/240.25 |
| 2003/0177269 A1 | 9/2003 | Robinson et al. | |
| 2003/0198184 A1* | 10/2003 | Huang et al. | 370/231 |
| 2003/0227977 A1* | 12/2003 | Henocq | 375/240.26 |
| 2004/0022322 A1* | 2/2004 | Dye | 375/240.26 |
| 2004/0067041 A1 | 4/2004 | Seo et al. | |
| 2004/0083236 A1 | 4/2004 | Rust | |
| 2004/0109005 A1 | 6/2004 | Witt et al. | |
| 2004/0184523 A1* | 9/2004 | Dawson et al. | 375/240.1 |
| 2004/0217980 A1 | 11/2004 | Radburn et al. | |
| 2005/0052294 A1 | 3/2005 | Liang et al. | |
| 2005/0081158 A1 | 4/2005 | Hwang | |
| 2005/0089092 A1* | 4/2005 | Hashimoto et al. | 375/240.03 |
| 2005/0100233 A1 | 5/2005 | Kajiki et al. | |
| 2005/0105619 A1* | 5/2005 | Lee et al. | 375/240.16 |
| 2005/0132286 A1 | 6/2005 | Rohrabaugh et al. | |
| 2005/0147247 A1 | 7/2005 | Westberg et al. | |
| 2005/0195899 A1* | 9/2005 | Han | 375/240.21 |
| 2005/0232359 A1 | 10/2005 | Cha | |
| 2005/0257167 A1 | 11/2005 | Fraleigh et al. | |
| 2005/0267779 A1 | 12/2005 | Lee et al. | |
| 2006/0018378 A1* | 1/2006 | Piccinelli et al. | 375/240.03 |
| 2006/0069797 A1 | 3/2006 | Abdo et al. | |
| 2006/0078051 A1* | 4/2006 | Liang et al. | 375/240.24 |
| 2006/0095944 A1 | 5/2006 | Demircin et al. | |
| 2006/0098738 A1* | 5/2006 | Cosman et al. | 375/240.16 |
| 2006/0150224 A1 | 7/2006 | Kamariotis | |
| 2006/0168101 A1 | 7/2006 | Mikhailov et al. | |
| 2006/0174026 A1 | 8/2006 | Robinson et al. | |
| 2006/0174614 A1 | 8/2006 | Dong et al. | |
| 2006/0184614 A1 | 8/2006 | Baratto et al. | |
| 2006/0210196 A1 | 9/2006 | Wensley et al. | |
| 2006/0218285 A1 | 9/2006 | Talwar et al. | |
| 2006/0233246 A1 | 10/2006 | Park et al. | |
| 2006/0277478 A1 | 12/2006 | Seraji et al. | |
| 2006/0282855 A1 | 12/2006 | Margulis | |
| 2006/0285594 A1 | 12/2006 | Kim et al. | |
| 2006/0291561 A1 | 12/2006 | Seong et al. | |
| 2007/0098283 A1 | 5/2007 | Kim et al. | |
| 2007/0116117 A1* | 5/2007 | Tong et al. | 375/240.08 |
| 2007/0121720 A1* | 5/2007 | Yamane et al. | 375/240.08 |
| 2007/0250711 A1 | 10/2007 | Storey | |
| 2007/0277109 A1 | 11/2007 | Chen et al. | |
| 2008/0062322 A1* | 3/2008 | Dey et al. | 375/240.22 |
| 2008/0065980 A1 | 3/2008 | Hedbor | |
| 2008/0071857 A1 | 3/2008 | Lie | |
| 2008/0158333 A1* | 7/2008 | Krisbergh et al. | 348/14.01 |
| 2009/0219992 A1* | 9/2009 | Wang | 375/240.03 |
| 2009/0245668 A1 | 10/2009 | Fukuhara et al. | |

OTHER PUBLICATIONS

PCT International Search Report and Written Opinion, PCT/US07/83218, Jun. 12, 2008, 7 pages.

PCT International Search Report and Written Opinion, PCT/US07/83214, Apr. 30, 2008, 7 pages.

PCT International Search Report and Written Opinion, PCT/US07/83203, Apr. 3, 2008, 9 pages.

Hsieh, M-D. et al., "Stateful Session Handoff for Mobile WWW," Revised Form Jan. 27, 2005, Accepted Feb. 26, 2005, Information Sciences, Elsevier, pp. 1241-1265, vol. 176.

Hsieh, M. et al., "Stateful Session Handoff for Mobile WWW," Information Sciences 2005, [online] [Retrieved Apr. 10, 2008] Retrieved from the Internet<URL:http:140.115.51.197/web/PaperManage/Paper/Stateful%20session%20handoff%20for%20mobile%20WWW.pdf>.

"NewFront Browser v3.4," Access Co., Ltd., Nov. 30, 2006 [online] [Retrieved on Jul. 11, 2008] Retrieved from the Internet<URL:http://www.access.company.com/PDF/NetFront/120406_NFv34.pdf>.

PCT International Search Report and Written Opinion, PCT/US08/52129, Jul. 23, 2008, 7 pages.

PCT International Search Report and Written Opinion, PCT/US08/52092, Jul. 14, 2008, 9 pages.

Warabino, T. et al., "Video Transcoding Proxy for 3G wireless Mobile Internet Access," IEEE Communications Magazine, Oct. 2000, pp. 66-71.

Japanese Office Action, Japanese Application No. 2009-534948, Feb. 18, 2013, 4 pages.

* cited by examiner

NETWORK-BASED DYNAMIC ENCODING

CROSS-REFERENCE TO RELATED APPLICATIONS

The present application claims priority under 35 U.S.C. §119(e) to U.S. Provisional Patent Application No. 60/863,888, filed on Nov. 1, 2006, entitled "CONTENT ACCESS USING COMPRESSION" which is incorporated by reference in its entirety.

BACKGROUND

1. Field of the Invention

This invention pertains in general to use video compression technology to encode and decode video frames, and in particular, to dynamically encoding a remotely displayed user applications based on feedback from a decoder and/or network conditions.

2. Description of the Related Art

Video compression is useful for transmission of digital video over a variety of bandwidth-limited networks, or for storage constrained applications. For example, the broadcast transmission of digital video at 24-bit per pixel sampled at 720 by 480 spatial resolution and 30 frames per second (fps) temporal resolution would require a bit rate of above 248 Mbps! Taking another example of supporting web browser applications with rich media content in a client-server architecture within a wireless network, bandwidth limitations of the wireless network itself may comprise one of the major limiting factors in fully utilizing the client-server architecture. Client devices, such as mobile phones, may additionally be resource-constrained with respect to the device's capabilities, including processing power, memory and battery life limitations. Compounding this, web browser applications are continually embracing rich media content, such as digital video and audio, which in turn poses further challenges for a client-server architecture. For applications such as digital television broadcasting, satellite television, Internet video streaming, video conferencing and video security over a variety of networks, limited transmission bandwidth or storage capacity stresses the demand for higher video compression ratios.

To improve compression efficiency, currently available coding standards, such as MPEG-1, MPEG-2, MEPG4 and H.264/AVC etc., remove information redundancy spatially within a video frame and temporally between video frames. The goal of video compression systems is to achieve the best fidelity (or the lowest distortion D) given the capacity of a transmission channel, subject to the coding rate constraint R(D). Most currently available coding standards employ some rate control mechanism to achieve such a goal. Prior art rate control algorithms are designed to dynamically adjust encoder parameters to achieve a target bitrate. They allocate a budget of bits to each group of pictures, individual picture and/or sub-pictures, in a video sequence. However, this optimization task is complicated by the fact that various coding options show varying efficiency at different bit rates and with different scene content. It is further complicated by lack of real time decoder feedback to guide the encoder parameters adjustment.

As alluded to above, existing video coding systems in use today, such as video broadcasting, are often designed to be open-loop systems, where there is no mechanism for a decoder to signal back to encoder. Most conventional encoders use a first-in-first-out (FIFO) on encoding output with a rate control method such as leaky bucket. As the FIFO buffer fills up, the encoder turns up a quantizer to reduce the bit rate. Other rate control techniques known to those skilled in the art may be used as well. Although the conventional rate control method keeps the peak and/or average bit rate controlled, it does not have the capability to dynamically tune the encoder according to available network bandwidth provided by decoder feedback or other source.

Another challenge faced by a video coding system is to maintain data integrity across noisy network channels. Transmission error detection and correction becomes more critical when compressed data are transmitted. A single transmission error is able to render a large amount of data useless. Conventional encoders deal with transmission loss/errors in three primary ways. First, a video frame is segmented into blocks. If a block gets corrupted, only part of the frame will be lost. This minimizes the effects of the error. Second, traditional encoders send periodic intra frames (I-frames) to clean up any previous transmission errors and/or due to a rigid group of pictures (GOP) structures. Third, encoders use redundant information available. This extra data can be used to replace corrupted data. However, a conventional encoder has to make intelligent error recovery decisions without feedback from decoder. For example, to use redundant information effectively, encoder has to send a lot of redundant data over the network. This increases the overall data transmitted on the network, and increases the likelihood of more errors. Periodically sending I-frames to the decoder sometimes may also seem unnecessary and wastes bandwidth when there are no errors. Intra frames are conventionally intra coded without using any other references frames for temporal prediction. Consequently, intra frames require more bandwidth to send over network than temporally predicted frames. If a decoder were able to signal back to encoder when and where an error is detected, the encoder can then decide whether a re-transmission is needed, or to change the current/next frame to be transmitted to allow decoder to move past the bad data.

In addition to rate and error control described above, a video encoding system often needs to be able to respond to requests from user or decoder itself. For example, one important encoding characteristic is resolution. A user may want to change the apparent or physical resolution of their screen for certain applications or due to network congestion. In another example, decoder input buffer fullness affects how many encoded frames a decoder can take, which in turn affects encoder rate control. In yet another example, a user may want to change his/her current mono sound to stereo sound for audio source configuration, or change the current audio sample rate (in KHz) for special sound effect. To respond to such requests, an encoder needs to change its encoding parameters. Conventional encoders lack such capability due to receive and process decoder feedback.

Hence, there is, inter alia, a lack of a system and method that provides decoder feedback to encoder within a video processing system.

BRIEF SUMMARY

The needs described above are addressed by a method, computer program product, and system for compressing remotely displayed user applications with optimization. In one embodiment, the system comprises an encoding unit, a decoder and a command process module. The encoding unit dynamically encodes data for transmission in response to a signal at the control input received from the command process module. The input of the encoding unit is coupled to receive data from for example a capturing unit configured to capture data at an adjustable sampling interval. The decoder is coupled to receive the encoded data signal from the encoding unit, decodes the encoded data signal and also collects back-channel information. The command process module couples the encoding unit and decoder and translates the back channel information into a control signal for adjusting an encoding and sampling rates. In another embodiment, the system includes a plurality of encoders, a plurality of decoders and a plurality of command process modules for transmitting both audio and video data. The encoding unit and the command process module are operable on a server, and the decoder and the command process module are operable on a client. The system further comprises a back channel information manager configured to receive back channel information from the command process module and generate the control signal to specify encoding. The present invention also includes method for encoding and decoding corresponding to the encoding unit and the decoder of the system.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
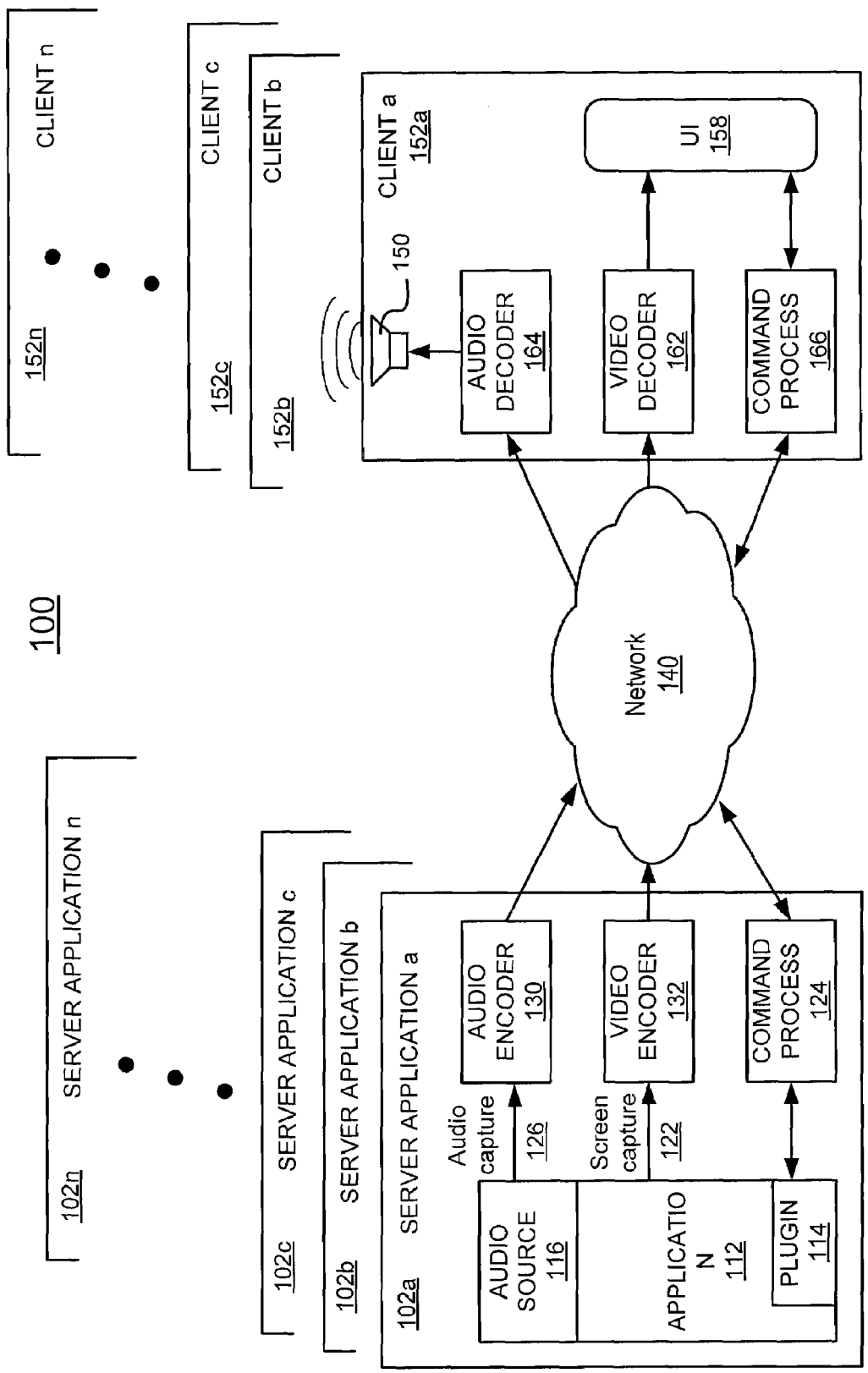
FIG. 1 is a block diagram illustrating a video processing system according to one embodiment of the present invention.

FIG. 1 is a block diagram illustrating a client-server architecture 100 having a network-based video processing system according to one embodiment. Client-server architecture 100 may include a number of server applications instances, 102a-102n. Server application 102n represents the number of server application instances that happen to be running in the system at any given point. In some embodiments, a server application 102 may comprise a full-featured web browsing application on behalf of a remote client. In some embodiments, all of the server applications 102 may comprise different instances of the same application, while in other embodiments, each server application 102 may comprise a potentially different application. The server applications illustrated in FIG. 1 may run on one server or any number of servers, as, for example, in a server farm environment.

Describing a server application 102 in further detail, a server application 102 may include an application 112, a plug-in 114, an audio source 116, an audio encoder module 130, a video encoder module 132, and a server-side command process module 124. A video encoder module 132 may be operatively coupled to the application 112, and may be adapted to receive a sequence of screen captures 122 of the user interface (UI) of the application 112, and encode the screen captures 122 into video frames for transmission via a network 140. In another embodiment, the video encoder module 132 may be adapted to receive a sequence of video frames from a frame buffer and encode the video frames into a video stream for transmission via the network 140. An audio encoder module 130 may be operatively coupled to the audio source 116, and may be adapted to transform the audio captures 126 of the audio source 116 into an encoded audio stream for transmission via the network 140. An audio source 116 may produce audio associated with the sequence of the application UI captures 122. The encoding of the application UI captures 122 and the audio captures 126 will be further described in conjunction with the encoding system 300 in FIG. 3.

A plug-in 114 may facilitate the remote interactive use of the application 112 via the client-server architecture 100 described in relation to FIG. 1. In some embodiments, plug-in 114 may work in conjunction with an application not fully, or at all, customized for use with a client-server architecture embodiment of this invention. In some embodiments, a server-side application may be customized for use with a client-server architecture embodiment of this invention, and a plug-in, such as plug-in 114, may not be needed.

A server-side command process module 124 receives a variety of commands from a client 152 through a back channel over the network 140. In one embodiment, the commands received from the client 152 include information of real time network capacity, decoding errors and encoding customization requests. The command process module 124 groups the information into different categories and sends it to the encoding system 300 for further processing. The encoding system 300 uses the information from the command process module 124 to optimize its encoding performance. The details the interaction between the command process module 124 and the encoding system 300 will be further described in conjunction with the encoding system 300 in FIG. 3 and the back channel information manager 330 in FIG. 4.

Client-server architecture 100 may include a number of clients, 152a-152n. As illustrated in FIG. 1, the different clients may comprise different, non-related client devices. Describing client 152 in further detail, a client 152 may include an audio decoder module 164, a video decoder module 162, a client-side command process module 166, an UI device 158 and a speaker 150. The video decoder module 162 may be adapted to decode the sequence of video frames encoded by the video encoder module 132, and the audio decoder 164 decodes the corresponding audio source encoded by the audio encoder 130. The sequence of video and frames is transmitted across the network 140 from the server application 102 to the client 152. The decoded frames by the video decoder 162 and the audio decoder 164 are displayed by the UI device 158 and output by the speaker 150, respectively. The decoding of the application UI captures 122 and the audio captures 126 will be further described in conjunction with the decoding system 500 in FIG. 5.

A client-side command process module 166 may be adapted to send one or more commands from a client 152. For example, command process module 166 may be adapted to send the real time decoder feedback to the video encoder module 132 for the video encoder module 132 to optimize its encoding performance. In some embodiments, the one or more commands may comprise a display resolution of the client 152. The encoder may resultantly only encode up to the maximum resolution of the client display. In other embodiments, the commands may comprise one or more additional client parameters, such as other screen parameters (e.g., screen size, refresh capabilities, backlighting capabilities, screen technology, etc.) or other parameters of the client device (e.g., available memory for use in storing video frames, location if GPS or other location technology-enabled, etc.). Those skilled in the art will recognize that similar real time decoder feedback can be sent from the command process module 166 to the audio encoder 130.

The network 140 enables communications between a server application 102 and one or more clients 152a-n. In one embodiment, the network 140 uses standard communications technologies and/or protocols. Thus, the network 140 may include fixed links using technologies such as Ethernet, integrated services digital network (ISDN), digital subscriber line (DSL), asynchronous transfer mode (ATM), or other fixed links technologies. The network 140 may also support mobile access using technologies such as Wideband Code Division Multiple Access (W-CDMA), CDMA200, Global System for Mobile Communications (GSM), General Packet Radio Service (GPRS), or similar technologies. Further, the network 140 may include wireless access using technologies, such as Wireless Local Area Network (W-LAN), Worldwide Interoperability for Microwave Access (WiMAX), or other wireless technologies.

Similarly, the networking protocols used on the network 140 may include multiprotocol label switching (MPLS), the transmission control protocol/Internet protocol (TCP/IP), the User Datagram Protocol (UDP), the session initiation protocol (SIP), the session description protocol (SDP), the hypertext transport protocol (HTTP), the simple mail transfer protocol (SMTP), the file transfer protocol (FTP), or any other suitable protocol. The data exchanged over the network 140 may be represented using technologies and/or formats including the hypertext markup language (HTML), the extensible markup language (XML), or any other suitable format. In addition, all or some of links may be encrypted using conventional encryption technologies, such as the secure sockets layer (SSL), Secure HTTP and/or virtual private networks (VPNs) or Internet Protocol security (IPsec). For example, for encoding sensitive data such as a user's personal bank statement displayed by the user's on-line banking system, the encoding system 300 may encrypt the video channel to carry the encoded bitstream before sending it over the video channel. In one embodiment, an encryption unit may reside in the encoding system 300 to encrypt the encoded bitstream. In another embodiment, the communications between a server application 102 and a client 152 may use custom and/or dedicated data communications technologies instead of, or in addition to, the ones described above.

Figure 2:
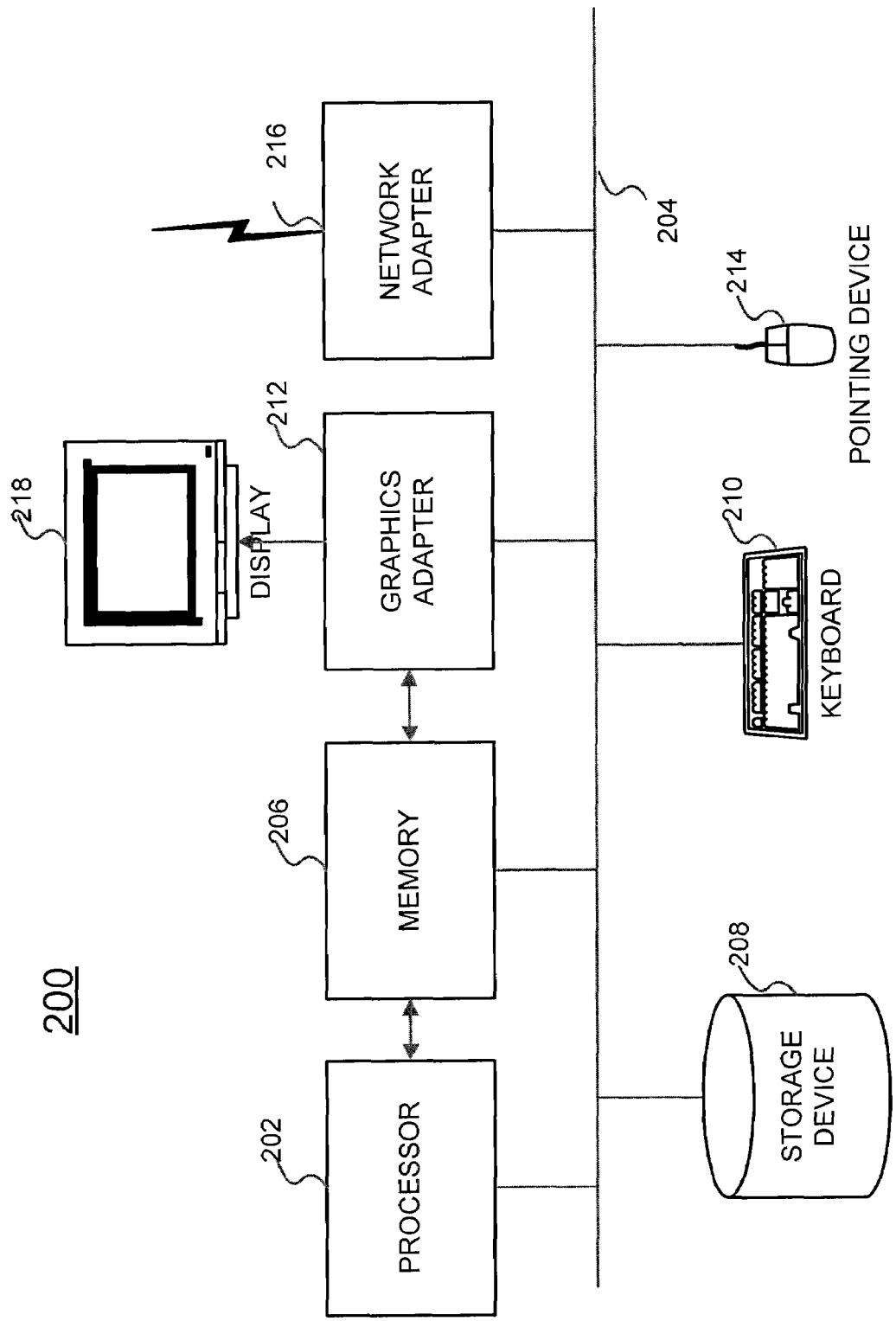
FIG. 2 is a block diagram of a computer for acting as a client, a server, an encoding system, and/or a decoding system according to one embodiment.
Figure 3:
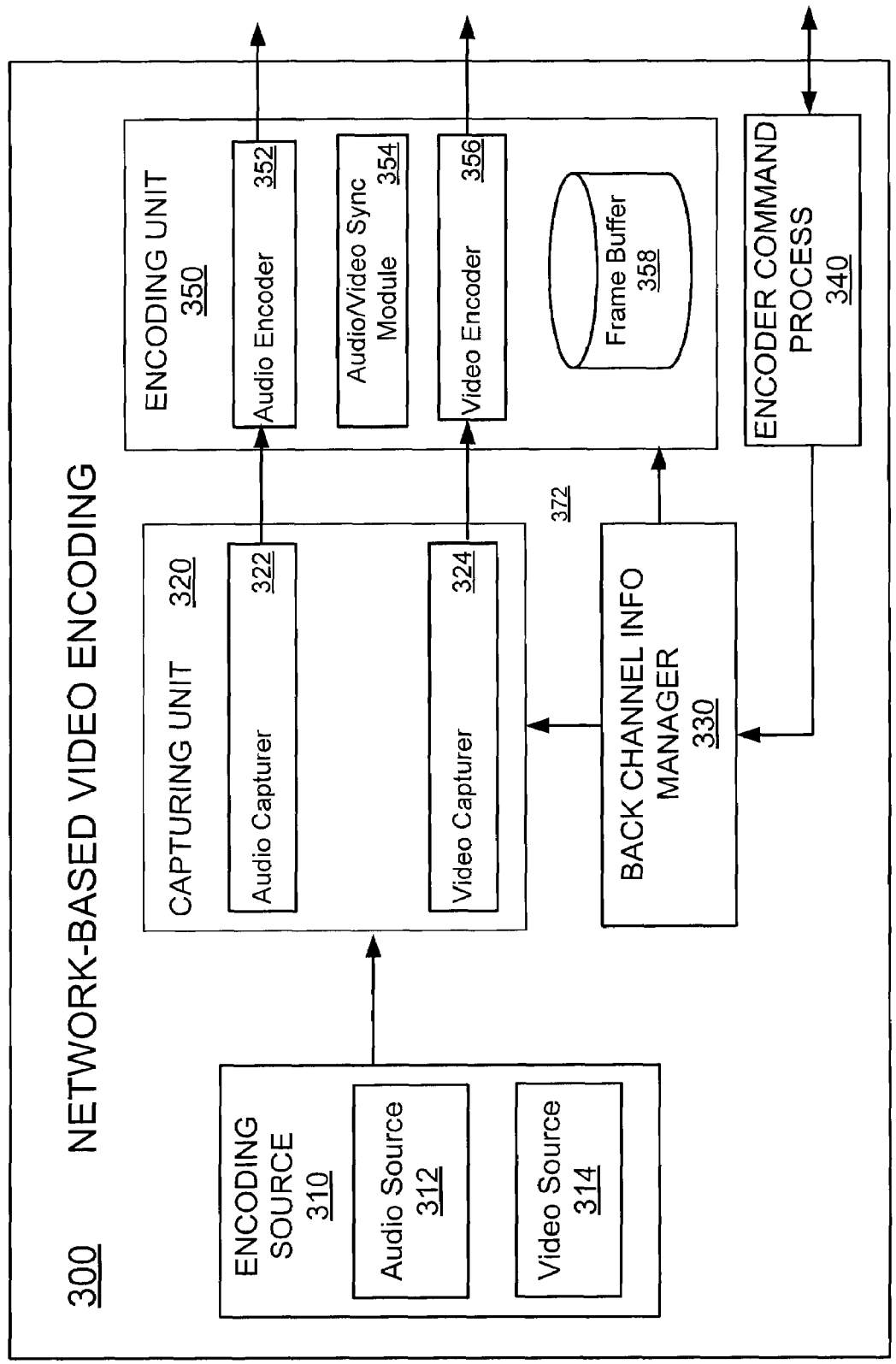
FIG. 3 is a block diagram illustrating a server having a network based video encoding system according to one embodiment.
Figure 5:
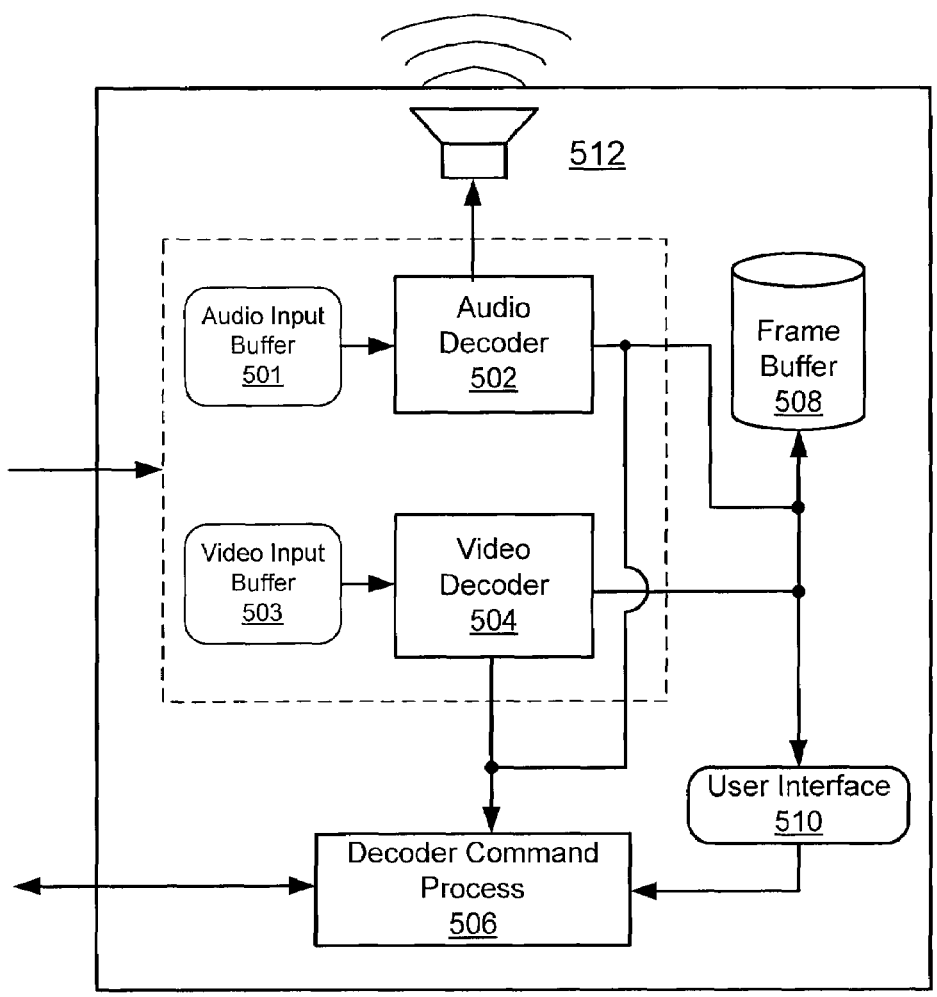
FIG. 5 is a block diagram illustrating a client having a network based video decoding system according to one embodiment.

FIG. 2 is a high-level block diagram of a computer 200 for acting as a client 152, an application server 102, an encoding system 300 in FIG. 3, and a decoding system 500 in FIG. 5 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. In one embodiment, the functionality of the bus 204 is provided by an interconnecting chipset. A display 218 is coupled to the graphics adapter 212.

The storage device 208 is any device capable of holding data, like a hard drive, compact disk read-only memory (CD-ROM), DVD, or a solid-state memory device. In one embodiment, the storage device 208 serves as a local storage. The memory 206 holds instructions and data used by the processor 202. The pointing device 214 may be a mouse, track ball, or other type of pointing device such as a touch screen, and is used in combination with the keyboard 210 to input data into the computer 200. The graphics adapter 212 displays images and other information on the display 218. The network adapter 216 couples the computer 200 to a local or wide area network.

As is known in the art, a computer 200 can have different and/or other components than those shown in FIG. 2. In addition, the computer 200 can lack certain illustrated components. For example, a computer 200 acting as a client 152 can lack a processor 202 that is used as a CPU and/or a 2D/3D graphic processor 212. Instead, a client 152 can have a network-based decoder that decodes a compressed frame encoded by an encoder and displays it on the display 218.

FIG. 3 is a server having a network based video encoding system 300 in a client-server architecture to encode the application UI captures 122 and the audio captures 126 in FIG. 1 according to one embodiment. When a user wants to go to a website, they launch a client side application 152 on an electronic computing device, such as a smart phone for a mobile user. The client application 152 opens a connection to the server 102a. The server 102a runs a browser instance or application 112, i.e., a full-featured server browser corresponding to the client application 152. For example, a mobile user does not need to run a full-featured mobile browser on their mobile phone. Instead, a full-featured web browser 112 is running on a hosted server 102 on his/her behalf. As such, the mobile user is able to access the entire web experience, not just a more limited one that their mobile browser supports. The web content is distributed to the client device 152 with television paradigm, that is, all data is processed and delivered as video. For each user, the encoding system 300 creates an encoder instance to handle compression for this user. The encoding system 300 will be understood by those skilled in the art to be those portions of the server 102 that relate to encoding and transmitting output signals.

The encoding system 300 includes an encoding source 310, a capturing unit 320, a back channel information manager 330, an encoder command process 340 and an encoding unit 350. In general terms, the capturing unit 320 captures the encoding source 310 at current sampling rate, sends the capture of the encoding source 310 to the encoding unit 350, and consults the back channel information manager 330 for any sampling interval adjustment needed for next screen capture. The encoder command process 340 receives back channel information from a client 152, processes the information and sends the processed information to the back channel information manger 330. In one embodiment, the back channel information includes the network capacity information, encoding error information and encoding customization requests. The back channel information manager 330 further processes the back channel information and updates the capturing unit 320 and the encoding unit 350. The encoding unit 350 encodes the capture sent from the capturing unit 320 and/or video frame samples stored in a frame buffer into a video stream and sends the encoded stream to the client over the network 140.

For purpose of this description, "sampling interval" is the difference in time between two consecutive video samples such as screen captures taken by the capturing unit 320. It represents the conventional sampling rate information in frame-per-second (fps) unit. In the context of the invention, the term "sampling interval" is used interchangeably with "sampling rate" from herein and throughout the entire specification. Details of sampling interval in the context of the encoding system 300 will be described in conjunction with the description of FIG. 10.

Turning now to the individual entities illustrated in FIG. 3, in one embodiment, the encoding source 310 includes an audio source 312 and a video source 314. The video source 314 is the web application (or any other application) 112 currently running on server 102 and the audio source 312 is the corresponding sound source generated by operation of server 102. In one embodiment, the web application plays a video clip, the video source 314 is a sequence of video frames of the video clip, and the audio source 312 is the corresponding sound source associated with each video frame. In another embodiment, the web application launches a still image, such as a JPEG image, a PNG image, etc. The video source 314 is the still image currently displayed by the browser, and the audio source 312 is the corresponding sound source of the still image if there is an associated sound for the image and/or web pages and FLASH™. In yet another embodiment, the video source 314 is the user interface generated by the web browser/application including a window, tool bar, status bar, menus and any content displayed within the window.

In the embodiment illustrated in FIG. 3, the capture unit 320 includes an audio capturer 322, and a video capturer 324. The video capture unit 324 captures the pixel-based browsing image of the video source 314 as would be displayed on the server screen (if displayed) and the audio capturer 322 captures the associated audio source 312 of the web application currently running by the server browser.

In one embodiment, the web application plays a video clip. The video capturer 324 captures the video frame of the clip being played and displayed at current time, and the audio capturer 322 captures the corresponding audio source 312 of the video frame. In another embodiment, the web application launches a still image. The video capturer 324 captures the still image currently being displayed by the browser, and the audio capturer 322 captures the corresponding sound source of the still image if there is an associated sound for the image and/or web page and FLASH™. Comparing with conventional web browsing applications, it is noted that the video source 314 data includes is converted and treated as video even though the video source 314 data is still images, the user interface presented by the application, input and feedback control, etc. The still image captured by the video capturer 324 is encoded as a video frame. To capture the encoding source 310 at a sampling rate consistent with current available network bandwidth, instead of blindly using the frame rate of the video clip, the capturing unit 320 consults the back channel information manager 330 for sampling rate information to guide its speed of capturing. The details on sampling rate information will be described in conjunction with the description of the back channel information manager 330.

The heart of the network-based video encoding system 300 is the encoding unit 350. In one embodiment, compression is handled by dedicated hardware with a very low latency encoder. In another embodiment, image of a static web page without embedded Flash or complex text/graphics can be compressed by a software encoder. Other embodiments may implement the encoding unit 350 in both hardware and/or software. The encoding unit 350 includes an audio encoder 352 to compress audio capture, a video encoder 356 to compress browsing images displayed on the browsing screen, an audio/video synchronization module 354 to synchronize the audio and video encoding, and a frame buffer 358 for reference frame management at server side. Other embodiments perform different and/or include additional modules than the ones described here. In one embodiment, the encoding unit 350 may include a user behavior model to track a user's activity in terms of encoding usage. For efficient resource provisioning, when a particular user logs in, a server browser instance and an encoder instance are allocated according to this user behavior model.

In one embodiment, the browser images captured by the capturing unit 320 are compressed using the current existing video compression algorithms, such as ISO/IEC MPEG-4 Part 10 (H.264), further optimized by decoder feedback capability and bitmap-mode compression. For example, in one embodiment, the encoding unit 350 employs the major components used in the H.264 video compression standard. More specifically, the video encoder 356 uses the DCT-like forward and reverse transforms on prediction residuals. The video encoder 356 also uses the flexible macroblock sizes ranging from 16×16 to 4×4. The various macro and sub-macroblock sizes allow fine-grained tuning of the blocks to the content being encoded. Other H.264 components, such as logarithmic quantizer, intra and inter prediction and context adaptive entropy encoding may also be used to perform the compression. In one embodiment, the encoding unit 350 also includes modules such as conventional rate controller and error recovery module used in conventional video coding standards as part of an optimized encoder control. Those skilled in the art will recognize that H.264 is used only by way of example and that a variety of other encoding and compression schemes may be used.

The encoding unit 350 optimizes the conventional encoding performance in various ways. Such encoding optimization is controlled in part by the back channel information manager 330 which instructs the capturing unit 320 to send the captures at the appropriate sampling rate to the encoding unit 350, and provides network capacity information and decoder feedback to the encoding unit 350 to dynamically adjust the encoding parameters. Taking audio encoding as an example, the back channel information may help the audio encoder 352 to dynamically set its encoding parameters, such as stereo/mono, compression bitrate, sampling rate (in KHz), etc. In one embodiment, the encoding unit 350 allows the video encoder 356 and audio encoder 352 to encode the browser images at a more appropriate sampling interval that is consistent with the current network capacity. In another embodiment, the encoding unit 350 allows the video encoder 356 and audio encoder 352 to dynamically handle the encoding errors based on the decoder feedback. In yet another embodiment, the encoding unit 350 allows the video encoder 356 and audio encoder 352 to dynamically adjust the encoding parameters to respond to the encoding customization requirement from the client. In yet another embodiment, the encoding unit 350 allows the video encoder 356 and audio encoder 352 to adjust according to content differences between frames. Since the browser may show the same information without change for a relatively long period of time as the user views a particular web page, unlike video, there are many times when there is no difference between frames. In such circumstances, the encoding unit 350 does not send same video frames to the decoder to improve coding efficiency.

Frame buffer management is often closely coupled with rate control in a video encoding system. The encoding unit 350 also benefits its frame buffer management from the back channel information. For example, an H.264 encoder relies on multiple reference frames to compress temporally related frames, i.e., the predictive frames (P-frames) and the bi-directionally predicted frames (B-frames). The H.264 encoder typically runs a complex algorithm to manage its frame buffer to selectively keep frames as reference frames. In contrast, the encoding unit 350 knows which frame is interesting to keep in the frame buffer 358 as indicated by a user. Only the interesting frames are kept as reference frames, and this greatly eliminates the buffer management complexity for the video encoder 356. For example, a user's home page shows up often during user's browsing experience. It will be very helpful to keep this page stored as a long-term reference frame in the encoder frame buffer 358. Furthermore, the fullness of the encoder buffer 358 can be monitored jointly with decoder input buffer fullness based on the back channel information from decoder 162.

Figure 4:
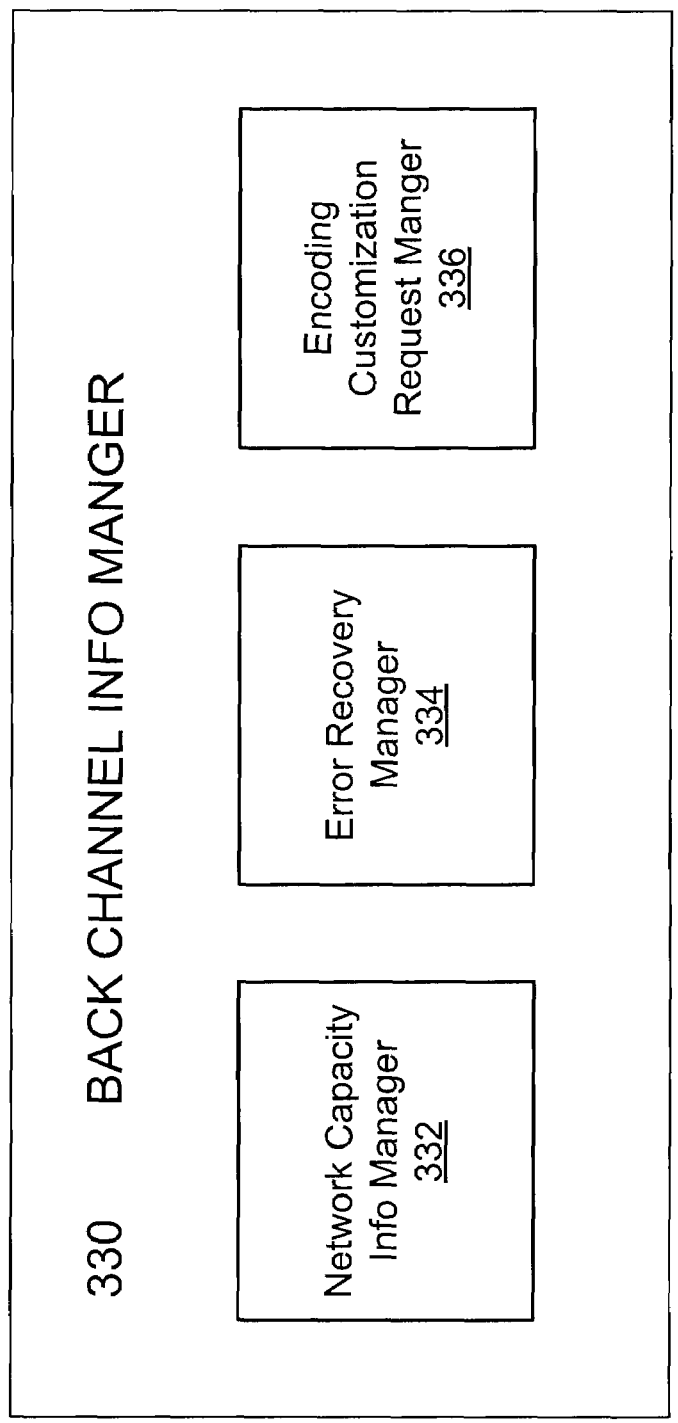
FIG. 4 is a block diagram illustrating modules within a back channel information manager according to one embodiment.

As described above, decoder feedback provided by the back channel information manger 330 guides the encoding unit 350 to dynamically set encoding parameters for optimization. FIG. 4 is a block diagram illustrating modules within a back channel information manager 330 according to one embodiment. The back channel information manager 330 includes a network capacity information manager 332, an error recovery manager 334 and an encoding customization request manager 336. The back channel information manager 330 receives the processed back channel information from the encoder command process 340, calculates the current sampling interval with the network capacity information manager 332, and updates the capturing unit 320 and/or the conventional rate controller embedded in the encoding unit 350. The error recovery manager 334 instructs the encoding unit 350 to adjust encoding parameter to handle the encoding errors based on the decoder feedback. Furthermore, the encoding customization request manager 336 instructs the encoding unit 350 to adjust encoding parameters to meet the user/decoder specific encoding requests. Consequently, the encoding unit 350 encodes the browser image sent from the capturing unit 320 at the updated sampling interval with a set of updated encoding parameters.

Turning now to the individual modules of the back channel information manager 330, the network capacity information manager 332 calculates the sampling interval for next screen capture based on the real time network capacity information from the encoder command process 340. It is noted that following description of the sampling interval calculation and further adjustment based on network bandwidth estimation are applicable to both video and audio encoding. For example, in response to received video network packets, the calculation and estimation is performed on the video packets and the results are used to adjust video capturing. Similarly, the calculation and estimation is performed in audio packets for audio capturing adjustment in response to received audio network packets. The audio/video synchronization module 354 synchronizes the video and audio data to generate the encoding bitstream for the encoding unit 350.

In one embodiment, the network capacity information manager 332 receives information on the last highest sequence number used in network packets, number of dropped packets and network jitter, and calculates the sampling interval using the received network data. The calculated sampling interval is biased such that it slows the encoding down faster than speeding the encoding up. The calculated sampling interval may be further biased such that the encoding unit 350 does not stay slow for beyond a threshold time and allows the encoding unit 350 to gradually increases over time.

In another embodiment, the sampling interval for next screen capture calculated from the real time network data (e.g., sequence number, number of dropped packets and network jitter) is treated as the maximum allowable sampling interval the encoding unit 350 needs to wait for the next screen capture to be encoded. The network capacity information manager 332 also calculates an estimated network bandwidth using a small sync packet and a sampling packet of an encoded frame. More specifically, the network capacity information manager 332 records the sending timestamps of both sync and sampling packets, and receives the receiving timestamps of both packets from the client 152 through a back channel. The network capacity information manager 332 uses these timestamps and packet sizes to calculate the estimation. The estimated network bandwidth provides an estimation of how long it takes for a typical packet of an encoded frame to travel through the network 140 to reach the decoder 162 at the client side. If the sampling interval for next screen capture is larger than the estimated transmit time, the sample interval is further reduced by an amount of the difference between the sampling interval and the estimated transit time. In response to the sampling interval for next screen capture being smaller than the estimated transmit time, the sample interval is increased by an amount of the difference between the sampling interval and the estimated transit time. In other embodiments, the encoding unit 350 uses the network capacity information to adjust other encoding parameters including compression ratio.

Figure 6:
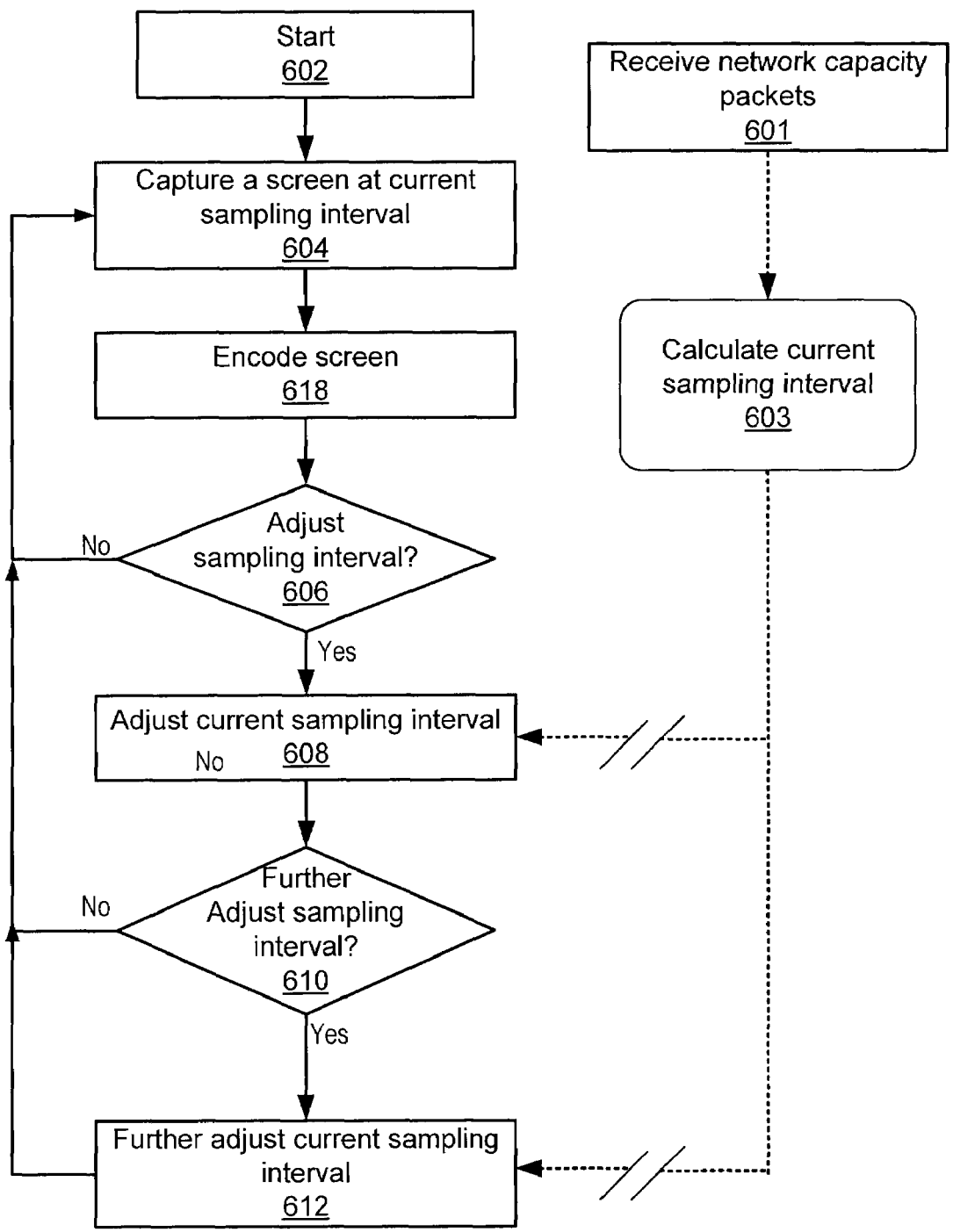
FIG. 6 is a flowchart showing a rate control process associated with a network-based encoding system according to one embodiment.

FIG. 6 is a flowchart showing a process of calculating the sampling interval for next screen capture by the network capacity information manager 332 according to one embodiment. Other embodiments perform different and/or additional steps than the ones described here. Moreover, other embodiments perform the steps in different order than that described below. For example, in one embodiment, the network capacity information manager 332 may work asynchronously with the capturing unit 320. In response to network capacity packets arriving 601 at the back channel information manager 330, the network capacity information manager 332 calculates 603 the current sampling interval. Before capturing begins, the capturing unit 320 checks whether its local current sampling interval has expired as compared with the current sampling interval (the dashed line in FIG. 6) calculated by the network capacity information manager 332, if so, it updates its local current sampling interval accordingly.

The process starts 602 when the server browser launches a browsing application or other applications. The capturing unit 320 captures 604 a browser screen at current sampling interval, and sends the current screen capture to the encoding unit 350 to encode 618. The capturing unit 320 also consults the back channel information manager 330 for the need to adjust 606 sampling interval for next screen capture. If there is no need to adjust the current sampling interval, the capturing unit 320 returns to step 604 and captures 604 the next screen capture at the current sampling interval. If there is a need for adjust the sampling interval for next screen capture, for example, current screen capturing is too fast or too slow in relation to the available network bandwidth, the capturing unit 320 adjusts 608 its current sampling interval to the updated sampling interval. In order to avoid overflowing the network 140, the capturing unit 320 also needs to determine whether the adjusted sampling interval still needs further adjustment 610. If there is no need to further adjust the sampling interval, the capturing unit 320 continues in step 604 with the adjusted sampling interval from step 608. For next screen capture, the capturing unit 320 captures 604 the screen at the updated sampling interval and sends the captured screen for encoding 618. If there is a need to further adjust the current sampling interval, the capturing unit 320 further adjusts 612 the current sampling interval for next screen capture, and returns to step 604 to capture the next screen capture at the further adjusted sampling interval.

In addition to the enhanced rate control provided by the network capacity information manager 332, the error recovery manager 334 of the back channel information manager 330 also optimizes the encoding performance by efficiently handling encoding errors. With the decoder feedback provided by the error recovery manager 324, the encoding unit 350 knows exactly when a decoder sees an encoding error and where the encoding error happens. To recover the encoding errors by the decoder 162, the encoding unit 350 only sends intra frames when needed, i.e., intra frames on demand. Thus, the encoding unit 350 is no longer limited by the conventional rigid GOP structure, such as every 16 frames, sending an intra frame. In one embodiment, only the first screen capture is encoded as an intra frame, and all subsequent screen captures are predicted from this intra frame by the encoding unit 350. In response to an encoding error, an appropriate frame is encoded as an intra frame and sent to the decoder to recover the error. In another embodiment, a set of blocks near where the encoding error happens is re-sent to the decoder for error correction. Encoding error detection and correction techniques known to those skilled in the art may be deployed together with the optimization from the decoder feedback.

Figure 7:
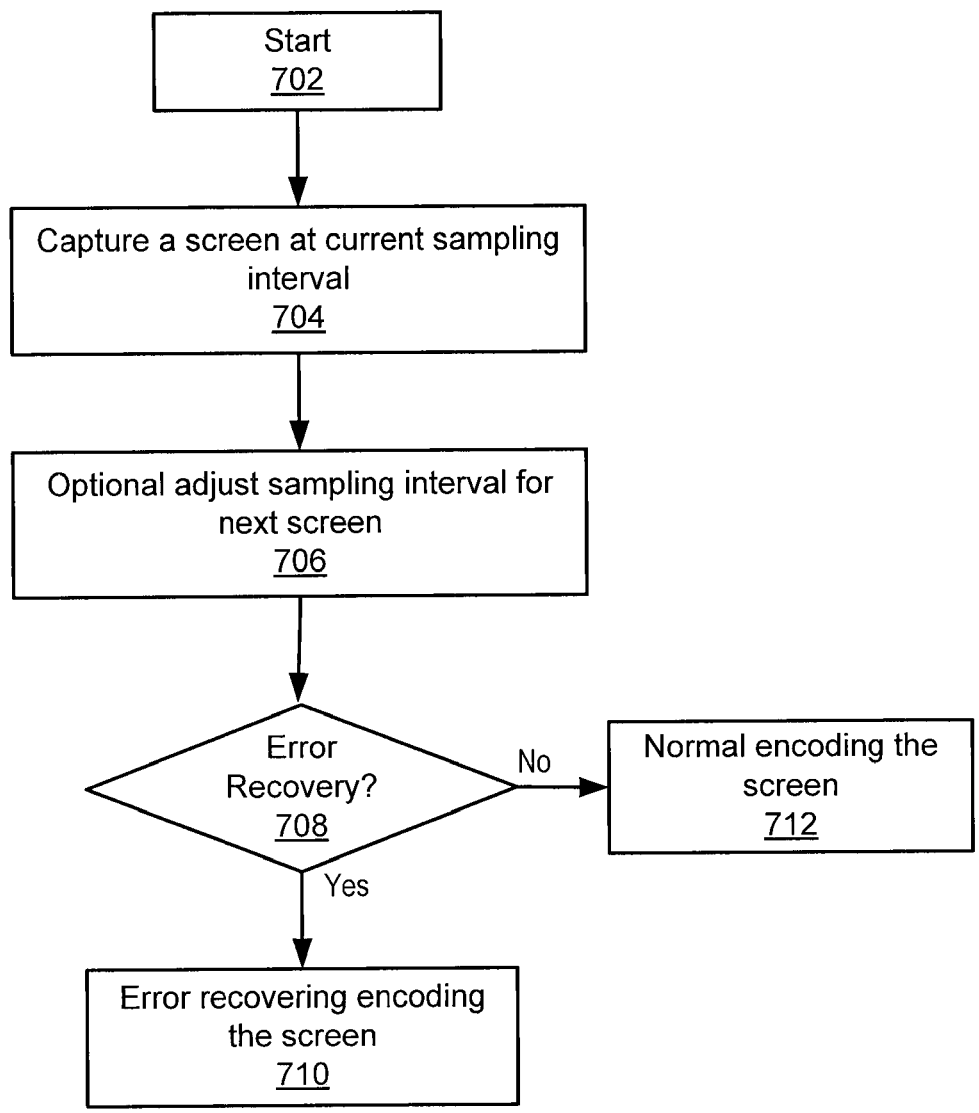
FIG. 7 is a flowchart showing an error control process associated with a network-based encoding system according to one embodiment.

FIG. 7 is a flowchart showing an encoding error recovering process associated with the network-based encoding system 300 according to one embodiment. Other embodiments perform different and/or additional steps than the ones described here. Moreover, other embodiments perform the steps in different orders.

The process starts 702 when the server browser launches a browsing application. The capturing unit 320 captures 704 a browser screen at current sampling interval, and consults the back channel information manager 330 for optional sampling interval adjustment 706 for next screen capture. The error recovery module 334 of the back channel information manager 330 updates 708 the encoding unit 350 if there is any encoding error reported by the decoder. If there is no encoding error reported, the encoding unit 350 performs 712 routine encoding process of the captured screen. If there is a need to handle the encoding errors, the encoding unit 350 adjusts the encoding parameters and performs 710 the error recovery procedure, such as re-encoding the corrupted frames, sending the intra frames on demand, etc.

The encoding customization request manager 336 also optimizes the encoding performance of the encoding unit 350 by allowing the encoding unit 350 to dynamically adjust encoding parameters to respond to requests from user or decoder itself. For example, the decoder 162 may decide to change the current resolution for all or part of the display screen to deal with limited bit rate. In one embodiment, the encoding unit 350 may include a user behavior model to track a user's activity in terms of encoding usage. When the user sends new encoding customization request to encoder, the encoding customization request manager 336 updates the user behavior model and allows the encoding unit 350 to adjust its encoding parameters to meet the encoding need.

Figure 8:
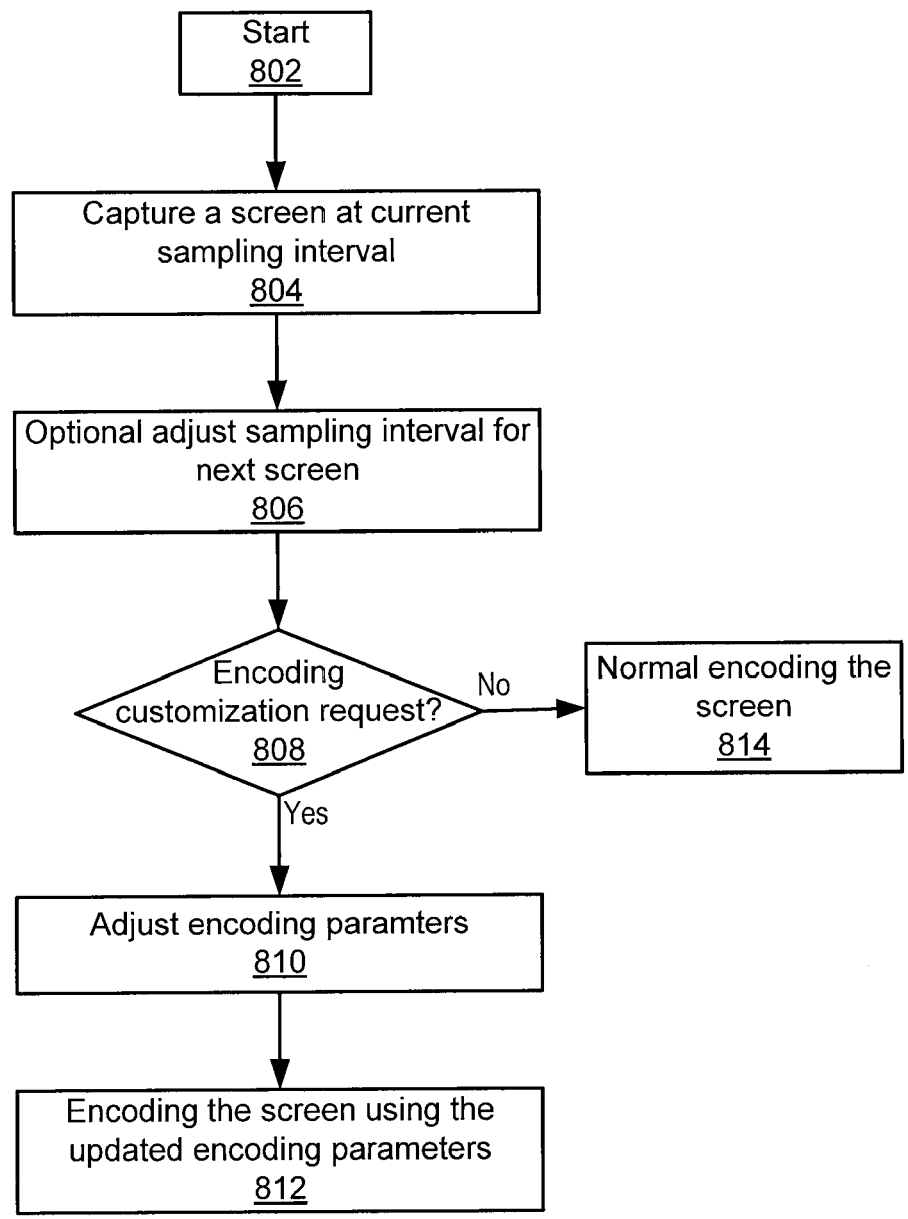
FIG. 8 is a flowchart showing an encoding customization requests handling process associated with a network-based encoding system according to one embodiment.

FIG. 8 is a flowchart showing encoding customization request handling process associated with the network-based encoding system 300 according to one embodiment. Other embodiments perform different and/or additional steps than the ones described here. Moreover, other embodiments perform the steps in different orders.

The process starts 802 when the server browser launches a browsing application. The capturing unit 320 captures 804 a browser screen at current sampling interval, and consults the back channel information manager 330 for optional sampling interval adjustment 806 for next screen capture. The encoding customization request manager 336 communicates 808 with the encoding unit 350 to determine whether any encoding customization requests were reported by the encoder command process 340. If there is no encoding customization request, the encoding unit 350 performs 814 routine encoding process of the captured screen. If there is an encoding customization request, the encoding unit 350 adjusts 810 the encoding parameters and encodes 812 the screen using the adjusted encoding parameters.

Figure 9A:
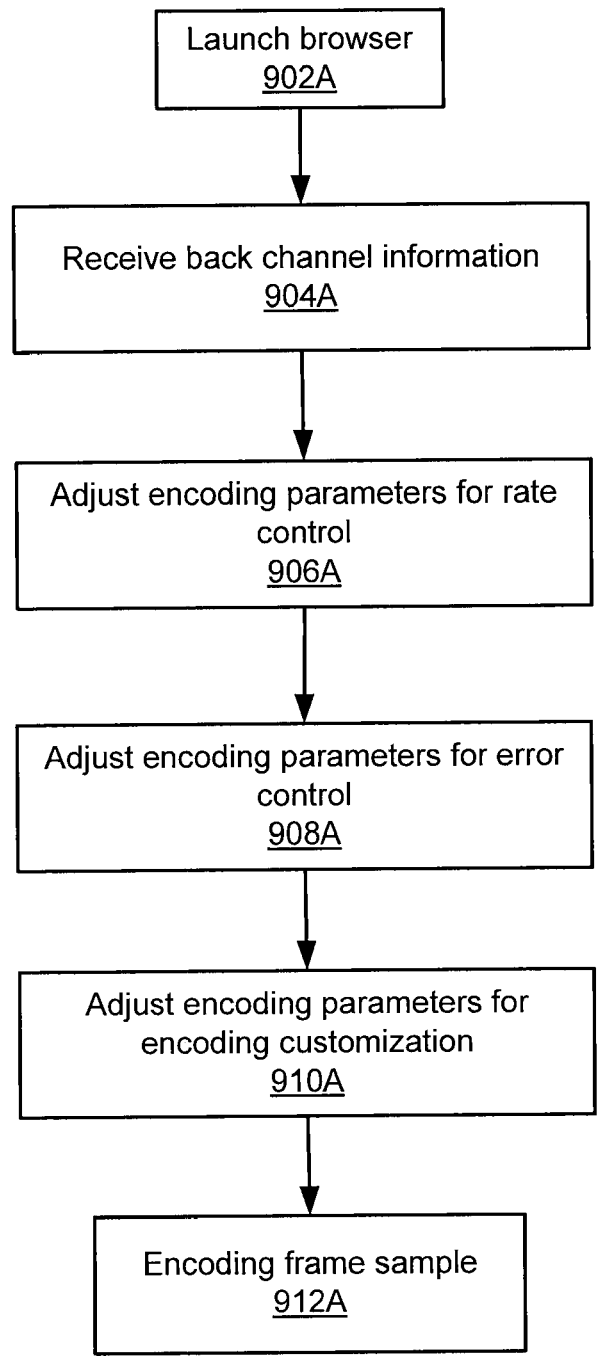
FIG. 9A is a high-level flowchart showing a network based encoding parameters adjustment method of using the network-based encoding system according to one embodiment.

In one embodiment, each encoding optimization technique, i.e., sampling interval adjustment, error recovery and encoding customization request, is handled by the individual process described in FIG. 6, FIG. 7 and FIG. 8, respectively. In other embodiments, a combined process may be performed to handle the encoding optimization. FIG. 9A is a high level flowchart showing a combined encoding optimization process associated with the network-based encoding system 300 according to one embodiment. Other embodiments perform different and/or additional steps than the ones described here. Moreover, other embodiments perform the steps in different orders.

The process starts 902A when the server 102 launches a browsing or other application. The encoder command process 340 receives 904A back channel information from the decoders, i.e., 502 and 504, over a network. The back channel information manager 330 processes the backchannel information and instructs the encoding unit 350 to update its encoding (audio and video) parameters if needed. In one embodiment, the encoding unit 350 receives a frame sample captured by the capturing unit 320 and adjusts 906A its encoding parameters to better control sampling rate. In step 908A, the encoding unit 350 adjusts its encoding parameter to better handle coding errors. The encoding unit 350 may further adjust 910A its encoding parameters to meet the encoding customization data from the decoders, 502 and 504. With the updated encoding parameters, the encoding unit 350 encodes 912A the frame sample.

Figure 9B:
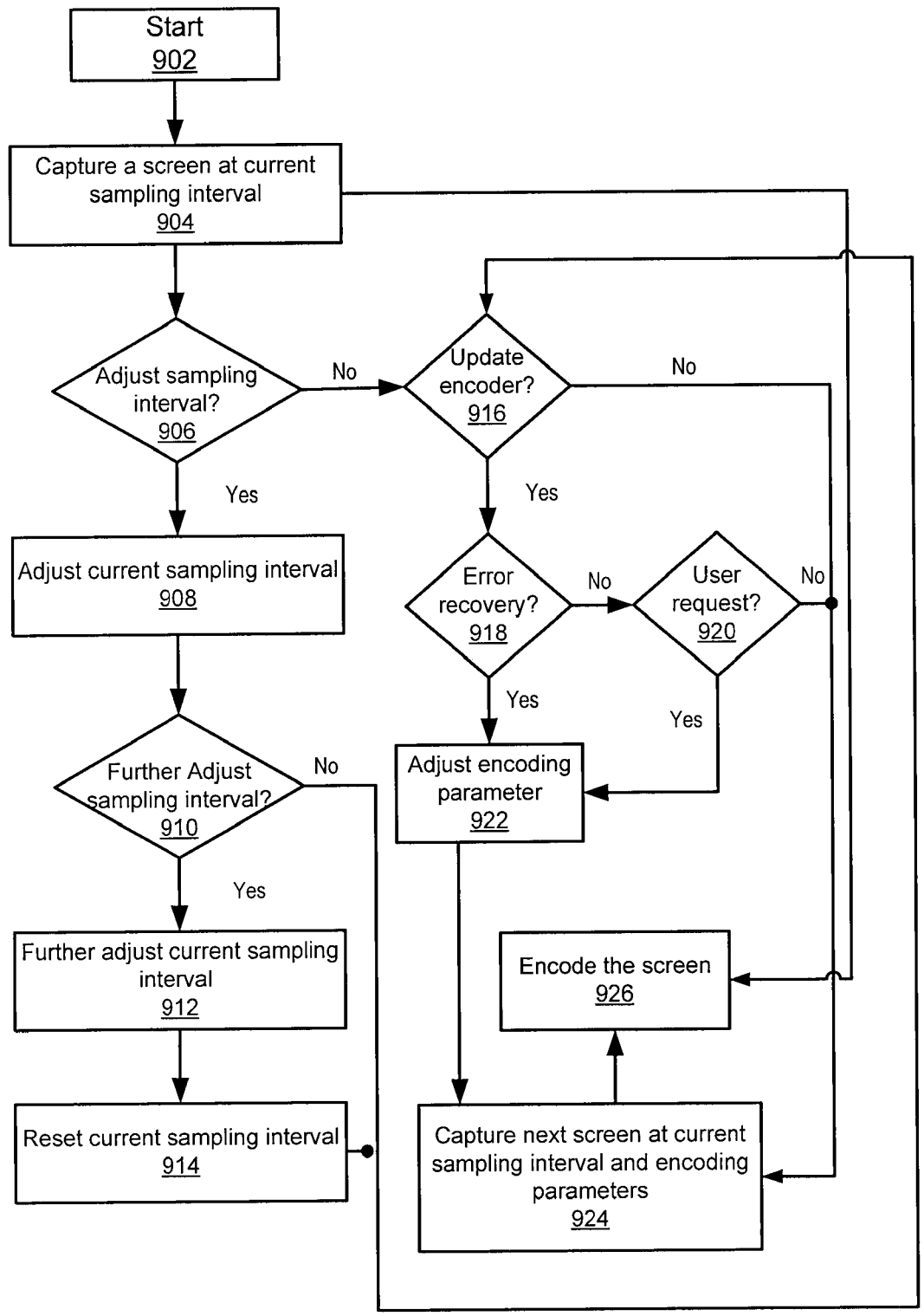
FIG. 9B is a flowchart showing a network based encoding parameters adjustment method of using the network-based encoding system for rate control, error control and encoding customization according to one embodiment.

FIG. 9B is a flowchart showing an example of combined encoding optimization process associated with the network-based encoding system 300 for rate control, error control and encoding customization according to one embodiment. Other embodiments perform different and/or additional steps than the ones described here. Moreover, other embodiments perform the steps in different orders.

The process starts 902 when the server browser launches a browsing application. The capturing unit 320 captures 904 a browser screen at current sampling interval, and sends the current screen capture to the encoding unit 350 for encoding 926. The capturing unit 320 also consults the back channel information manager 330 for the need to adjust 906 the current sampling interval for next screen capture. If there is no need to adjust the current sampling interval, the encoding unit 350 consults the back channel information manager 330 for any need to update 916 the encoding parameters. If there is no need to update the encoder coding parameters, the capturing unit 320 captures 924 the next screen at current sampling interval and encoding parameters. If there is a need for adjust the current sampling interval, the network capacity information manager 332 calculates the updated sampling interval and notifies the capturing unit 320. In return, the capturing unit 320 adjusts 908 the current sampling interval. In order to avoid overflow the network, the capturing unit 320 also needs to know the adjusted sampling interval still needs further adjustment 910. If there is a need to further adjust the sampling interval, the capturing unit 320 further adjusts 912 the sampling interval, and resets 914 the current sampling interval to the updated one. The encoding unit 350 consults with the back channel information manager 330 for any other encoder update 916. If there is a need to update encoder, the encoding unit 350 checks whether the update is due to encoding errors 918. If the encoder update is not due to encoding errors, the encoding unit 350 further checks whether it is from encoding customization request 920. If answer to step 920 is no, the capturing unit 320 captures 924 the next screen at current sampling interval and the encoding unit 350 encodes the next screen capture using the current encoding parameter. If the answer to step 918 or 920 is yes, the encoding unit 350 adjusts 922 the encoding parameters and goes to step 924 followed by step 926.

Turning now back to FIG. 5, in one embodiment, FIG. 5 is a block diagram illustrating a client having a network based video decoding system 500 in a client-server architecture. The system 500 includes an audio input buffer 501, an audio decoder 502, a video input buffer 503, a video decoder 504, a decoder command process module 506, a decoder frame buffer 508, a user interface device 510 and an audio speaker 512. The system 500 receives the compressed video and/or audio data over the network 140, and stores the video and/or audio data into the video input buffer 503 and/or audio input buffer 501, respectively, decodes the compressed data by the video decoder 504 and/or the audio decoder 502, and displays the decompressed data by a local LCD screen associated with the user interface device 510. In one embodiment, the video and/or audio decoding techniques known to those skilled in the art are used to decode the compressed data.

To provide decoder feedback to the encoding unit 350, the decoder command process module 506 sets up a back channel that connects the decoding system 500 back to a host server, e.g., a browser server. The video decoder 504 decodes the compressed video data and sends it immediately to the display of the UI device 510 in one embodiment. The audio decoder 502 decodes the compressed audio data associated with the decoded video data and sends it immediately to the audio speaker 512. In another embodiment, the video decoder 504 sends the decoded data to the frame buffer 508 and allows a delayed playback. The audio decoder 502 sends the decoded data associated with the decoded video data to the frame buffer 508. Such delay is needed when the decoders 502 and 504 have limited bandwidth and/or has to deal with encoding errors. The decoders 502 and 504 also report information on network capacity, identified encoding errors, and encoding customization requests to the decoder command process 506. For example, in one embodiment, the decoder 504 reports the last highest sequence number of the video packets received, packet arriving time, number of packets dropped, and network jitter information. The decoder 504 may report how full the video input buffer 503 is, and whether there is a need to request intra frame to correct encoding errors. Similarly, the audio decoder 502 performs similar reporting to the decoder command process 506 based on the audio packets decoding. Such decoder feedback is grouped together and sent by the decoder command process 506 over the network 140 to the server.

Figure 10:
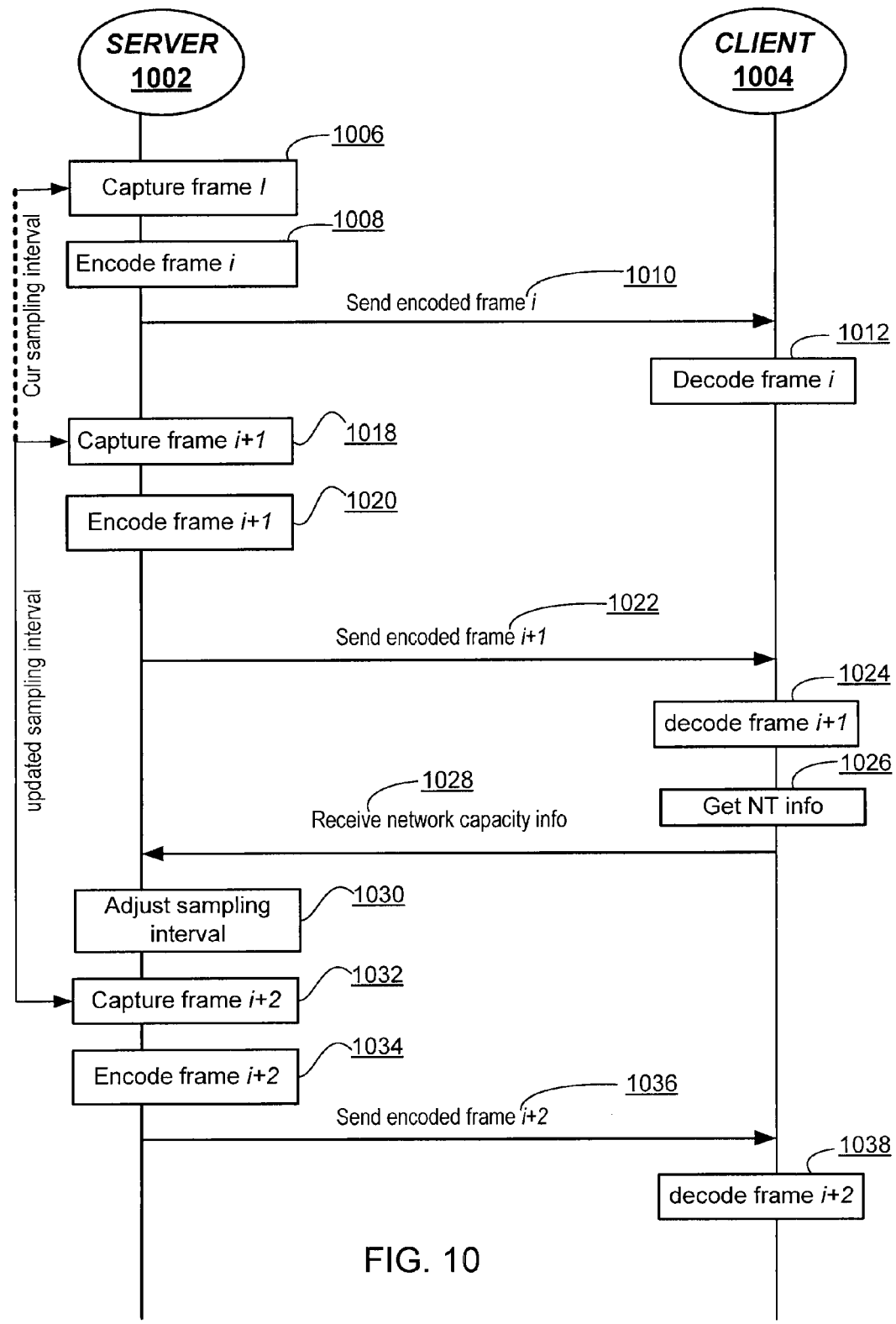
FIG. 10 is a flowchart showing a communication process regarding sampling interval update between a server and a client according to one embodiment.

FIG. 10 is a flowchart showing an encoding communication process regarding sampling interval update between the server 1002 and the client 1004 in a client-server architecture according to one embodiment. Server 1002 implements the network-based encoding system 300 depicted in FIG. 3, and client 1004 implements the network-based decoding system 500 depicted in FIG. 5. On the server side, server 1002 captures 1006 a browsing screen as frame i at time 0, encodes 1008 the frame i and sends 1010 the encoded frame i to client 1004. Due to the asynchronous operations performed on the server 1002, in one embodiment, the server 1002 may process the network capacity packets at a rate different from the sending rate of the encoded bitstream. For example, server 1002 may process the network capacity packets in a few seconds, while it keeps sending encoded bitstream out over the network in accordance with the current network bandwidth. At time 1, server 1002 captures 1018 captures another browsing screen, frame i+1, encodes 1020 the frame i+1 and sends 1022 the encoded frame i+1 to client 1004. The time difference between time 0 and time 1 constitutes the current sampling interval, illustrated by the dashed line in the figure. Server 1002 at some time later receives 1028 the new network capacity information from client 1004 through the back channel. The network capacity information manager 324 calculates an estimated network capacity and updated sampling interval and sends the instruction to server 1002. Server 1002 adjusts 1030 the sampling interval, captures 1032 the next browsing screen frame i+2 at time 2 suggested by the updated sampling interval, encodes 1034 the frame i+2, and sends 1036 the frame i+2 to client 1004.

At the client side, client 1004 receives the encoded frame i, decodes 1012 the frame i. Client 1004 some time later receives the encoded frame i+1, decodes 1024 the frame i+1, collects 1026 decoder feedback and network capacity related information and sends them through the back channel to server 1002. At another time, client 1004 receives another encoded frame, frame i+2, decodes 1038 the frame i+2 and continues its decoding and providing feedback process until all frames are decoded.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A system for encoding data comprising:
a capturing unit having a first control input and configured to capture data at an adjustable sampling rate in response to a first control signal received at the first control input;
an encoding unit having a data input, a data output and a second control input, for dynamically encoding data for transmission, the input of the encoding unit coupled to receive the captured data, and the output of the encoding unit providing encoded data, the encoding unit adjusting encoding parameters in response to a second control signal received at the second control input;
a command process module coupled to the second control input and coupled to receive back channel information, the command process module configured to calculate at least one encoding parameter for encoding the data input at the encoding unit, and to provide the second control signal for adjusting encoding parameters based on the back channel information comprising at least one of network capacity information, encoding error information, and encoding customization requests received from a client device;

a network capacity information manager coupled to the first control input and coupled to receive the network capacity information, the network capacity information manager configured to asynchronously calculate the sampling rate for capturing the data at the capture unit, and to provide the first control signal for adjusting the sampling rate at the capture unit based on the network capacity information; and an encoding error recovery manager configured to identify encoding errors based on the back channel information, the encoding error recovery manager coupled to the control input of the encoding unit for instructing the encoding unit to dynamically adjust an encoding parameter responsive to identifying the encoding errors.

2. The system of claim 1, wherein asynchronously calculating the sampling rate for capturing the data at the capture unit comprises calculating the sampling rate at the network capacity information manager independently from the at least one encoding parameter.

3. The system of claim 1, wherein the encoding unit comprises:
a first encoder coupled to the data input to receive video data and to encode video data; and
a second encoder coupled to the data input to receive audio data and to encode audio data, the audio data associated with the video data.

4. The system of claim 3, wherein the encoding unit further comprises:
a synchronization module to synchronize audio and video encoding, the synchronization module coupled to the first encoder and the second encoder.

5. The system of claim 1, further comprising a back channel information manager configured to receive the back channel information and generate the second control signal to specify an encoding rate at the encoding unit, the back channel information manager coupled to the command process module and the second control input of the encoding unit.

6. The system of claim 5, wherein the back channel information manager comprises:
an encoding customization information request manager configured to update the encoding unit about encoding customization requests, the encoding customization information request manager coupled to the command process module and the control input of the encoding unit.

7. The system of claim 1, wherein the encoding unit is configured to adjust encoding parameters according to a current sampling rate.

8. The system of claim 1, wherein the encoding unit is configured to adjust encoding parameters according to the encoding error information or encoding customization information.

9. The system of claim 7, wherein the encoding unit is configured to encode data using the adjusted encoding parameters.

10. The system of claim 9, wherein the adjusted encoding parameters are video encoding parameters.

11. The system of claim 9, wherein the adjusted encoding parameters are audio encoding parameters.

12. The system of claim 1 further comprising an encryption unit coupled to the output of encoding unit for encrypting the encoded data, an output of the encryption unit providing encrypted data.

13. A method for encoding data comprising:
capturing data based on an adjustable sampling rate for encoding;
encoding the captured data based on dynamically adjustable encoding parameters for transmission;
receiving back channel information comprising network capacity information, encoding error information, and encoding customization requests received from a client device;
dynamically setting the adjustable encoding parameters for encoding the captured data based on the back channel information, the encoding parameters updated based on changes in the back channel information;
modifying the sampling rate of data capture for encoding asynchronously from the encoding parameters based on the received back channel information;
identify encoding errors in the encoded data based on the back channel information;
adjusting the encoding parameters responsive to the encoding error information; and
encoding data captured at the modified sampling rate using the adjusted encoding parameters for transmission.

14. The method of claim 13 wherein modifying the sampling rate of data capture for encoding asynchronously from the encoding parameters based on the received back channel information comprises calculating the sampling rate for capturing the data independently from the encoding parameters.

15. The method of claim 13, wherein the back channel information is at least one of the following:
encoding error information for notifying an encoder about coding errors; and
encoding customization information for notifying the encoder about encoding customization requests.

16. The method of claim 13 further comprising further adjusting the encoding rate according to a current sampling rate.

17. The method of claim 13, wherein encoding data using the encoding parameters comprises adjusting the encoding parameter according to an encoding rate.

18. The method of claim 13, wherein encoding data using the encoding parameters further comprises one of the following:
adjusting encoding parameters according to a coding error information; and
adjusting encoding parameters according to an encoding customization information.

19. The method of claim 13, further comprising encrypting the encoded data.

20. A system for decoding a data stream, the system comprising:
a decoding unit, of a client device, having an input, a first output and second output, for decoding a data stream, identifying encoding errors and collecting back channel information comprising network capacity information and encoding customization requests of the client device, the input of the decoding unit coupled to receive an encoded data stream, the first output of the decoding unit providing a decoded data output, and the second output of the decoding unit providing the identified encoding errors and the back channel information; and
a command process module coupled to the decoding unit for receiving the identified encoding errors and the back channel information, the command process module configured to transmit the identified encoding errors and the back channel information for:
calculating dynamically adjustable encoding parameters for encoding the data stream received at the client device based on the identified encoding errors and the back channel information; and calculating a sampling rate for capturing data encoded for the data stream received at the client device based on the back channel information, the sampling rate adjusted asynchronously from the encoding parameters based on the network capacity information.

21. The system of claim 20, wherein the decoding unit comprises:

a first input buffer for storing a video portion of the data stream;

a first decoder for decoding video data and collecting video back channel information, the first decoder coupled to the first input buffer;

a second input buffer for storing a audio portion of the data stream; and a second decoder for decoding the audio data and collecting audio back channel information.

22. The system of claim 20, wherein the back channel information comprises:

encoding customization information for notifying the encoder about encoding customization requests.

23. The system of claim 20, wherein the back channel information further comprises:

network capacity information for calculating a compression ratio.

24. The system of claim 1, wherein the encoding unit further comprises:

a frame buffer for reference frame management, the frame buffer coupled to the data input to receive data.

25. The system of claim 24, wherein the frame buffer for reference frame management is configured to receive instructions from outside the encoding unit.

* * * * *